(No Model.) 7 Sheets—Sheet 1.

J. P. DUNN.
MACHINE FOR PRINTING, DATING, AND REGISTERING TICKETS.

No. 345,624. Patented July 13, 1886.

Fig. 1

Witnesses.
Robert Emmett
J. A. Rutherford

Inventor.
J. Paris Dunn.
By James L. Norris.
Atty

N. PETERS, Photo-Lithographer, Washington, D. C.

(No Model.) 7 Sheets—Sheet 3.

J. P. DUNN.
MACHINE FOR PRINTING, DATING, AND REGISTERING TICKETS.

No. 345,624. Patented July 13, 1886.

Fig. 3.

Witnesses.
Robt. Everett.
J. A. Rutherford.

Inventor.
J. Paris Dunn.
By James L. Norris,
Atty.

(No Model.) 7 Sheets—Sheet 5.

J. P. DUNN.
MACHINE FOR PRINTING, DATING, AND REGISTERING TICKETS.

No. 345,624. Patented July 13, 1886.

Witnesses:
Robert Everett
J. A. Rutherford

Inventor:
J. Paris Dunn,
By James L. Norris,
Atty.

(No Model.) 7 Sheets—Sheet 6.

J. P. DUNN.
MACHINE FOR PRINTING, DATING, AND REGISTERING TICKETS.

No. 345,624. Patented July 13, 1886.

Witnesses.

Inventor.
J. Paris Dunn.
By James L. Norris.
Atty.

(No Model.)   7 Sheets—Sheet 7

J. P. DUNN.
MACHINE FOR PRINTING, DATING, AND REGISTERING TICKETS.

No. 345,624. Patented July 13, 1886.

Witnesses.
Robert Everett.
J. A. Rutherford

Inventor:
J. Paris Dunn,
By James L. Norris.
Atty.

UNITED STATES PATENT OFFICE.

J. PARIS DUNN, OF NEW YORK, N. Y.

MACHINE FOR PRINTING, DATING, AND REGISTERING TICKETS.

SPECIFICATION forming part of Letters Patent No. 345,624, dated July 13, 1886.

Application filed March 16, 1885. Renewed June 3, 1886. Serial No. 204,103. (No model.)

*To all whom it may concern:*

Be it known that I, J. PARIS DUNN, a citizen of the United States, residing at New York city, in the county and State of New York, have invented new and useful Improvements in Machines for Dating, Printing, Registering the Sales of, and Delivering Tickets of Different Values or Classes, of which the following is a specification.

My invention relates to automatic mechanism for dating and printing tickets as they are separately called for and sold, and for registering each sale at the time the ticket is printed, detached, and delivered to the purchaser.

It is the purpose of my invention to provide automatic mechanism for dating and printing, detaching, and delivering to the purchaser tickets of the class universally used upon surface and elevated railways, upon steamboats and ferries, and in theaters or concert-halls, each separate sale being registered simultaneously with the printing and delivery of the ticket sold, the entire series of operations being performed and the ticket delivered to the customer by the automatic mechanism employed, and without the possibility of any manual interference by the cashier or any other person.

It is also my purpose to provide mechanism of the class described whereby tickets of different prices or of different classes may be printed, sold, and registered, all the sales under each price or in each class being registered separately, and the mechanism being so constructed and combined that the apparatus may at any moment be shifted or adjusted to print, register, and deliver one or more tickets of any one of said prices and classes.

It is also my purpose to so combine the printing and the registering devices that whenever the former are adjusted to print a ticket of any one of the prices or classes provided for the registering mechanism must unavoidably be actuated in such manner as to register a sale under said price or class, whereby all possibility of tampering with the machine by adjusting it to print without registering, or to print one price and register a less price, is wholly avoided.

It is also my purpose to combine with the printing devices a separate automatically-operated dating-stamp, so placed that it is accessible to the operator for purposes of daily adjustment.

It is also my purpose to simplify and improve the construction of the stamp by which the tickets are printed; to render the feeding devices whereby the ticket-strip is advanced more accurate in operation, and to combine therewith means for actuating the dating-stamp and the printing-stamp; to simplify the construction and to improve the operation of the devices whereby the several operative parts are adjusted to print and register the sales of tickets of different value, of different classes, or of different kinds, and to combine with the multiple stamp means for indicating to the eye of an observer the price or class of tickets which are at the time being printed and registered by the apparatus.

It is also my purpose to simplify and improve the construction and operation of certain parts of the mechanism shown in an application for Letters Patent heretofore filed by me; and my present invention consists, among other features, in an improvement upon the invention shown and described in the application for Letters Patent of the United States filed by me upon the 15th day of January, A. D. 1885, Serial No. 153,000, and an application filed the 30th day of September, 1884, Serial No. 144,361.

My invention also consists in the several novel features of construction and combinations of parts, which are hereinafter fully set forth, and definitely pointed out in the claims annexed to this specification.

Referring to the drawings, forming part of this application.

In the said drawings the reference-numeral 1 indicates the closed casing containing the principal operative parts, with the exception of the dating-stamp, which is arranged without the casing, the latter being constructed of metal of suitable strength, and provided with a door, 2, whereby the duly authorized person may have entrance to the interior for any proper purpose.

With the single exception of the dating-stamp, all the operative parts of the machine are wholly inclosed within the casing.

So far as the construction of the casing and the manner of its attachment are essential, these features are shown fully in my application filed January 15, 1885, Serial No. 153,000.

Figure 10:
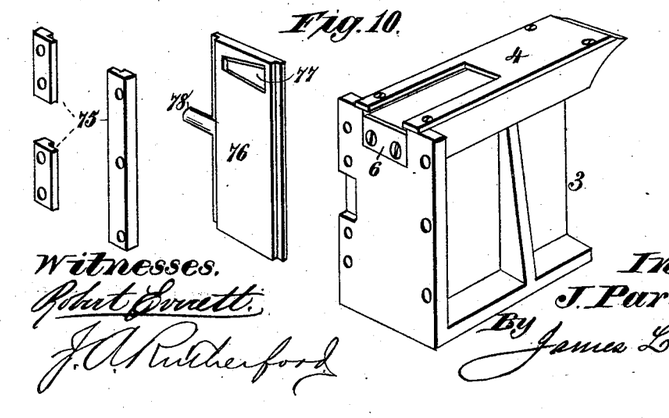
Fig. 10 is a detail perspective of the ticket-trough, showing the cutter at one end, the reciprocating knife being illustrated separately in said figure, together with the guides confining it in place.
Figure 11:
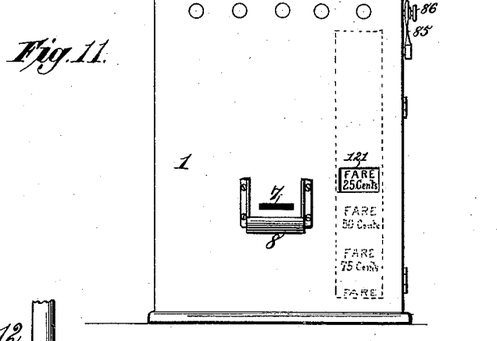
Fig. 11 is an end elevation of the casing, showing the openings for reading the registers, the manner of indicating and adjusting the price-indicator, and the hopper to which the printed, dated, and registered ticket is delivered by the apparatus.

Upon the floor of the casing is mounted a casting, 3, (shown separately in Fig. 10.) The upper surface of this casting is provided with a channel, which is covered with a plate, 4, cut away near one end to form an oblong rectangular opening, through which the printing-stamp may descend to act upon the face of the continuous ticket-strip 5. In the front end of the casting is set a blade, 6, over which the ticket-strip passes, and adjacent to the end of the trough is the wall of the casing, having an opening, 7, through which the ticket passes after it has been printed. Beneath the said opening is a hopper, 8, or other suitable receptacle, within which the ticket falls after it has been dated, printed, registered, and severed from the strip. The rear end of the casting 3 is undercut, and a lower feed-roll, 9, is placed in the space thus formed, having its periphery in the plane of the ticket-trough.

Figure 3:
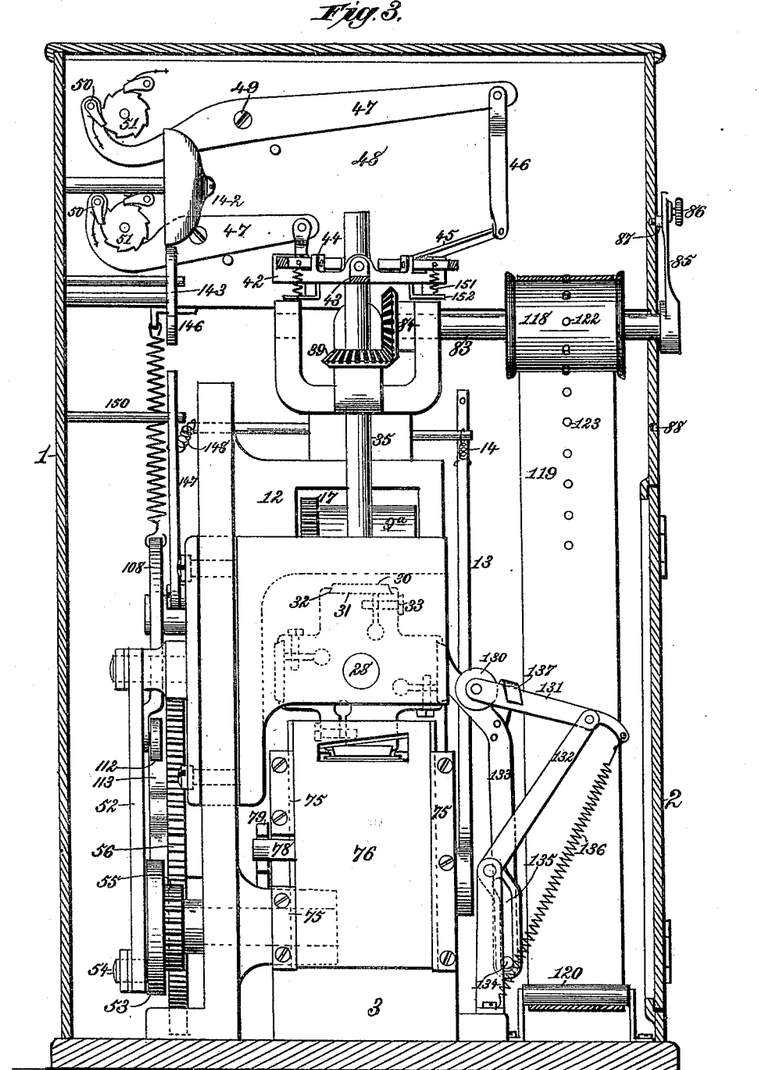
Fig. 3 is a vertical section at right angles to Figs. 1 and 2, taken in a plane just within the vertical wall of the casing, upon the left side of Fig. 2.
Figure 4:
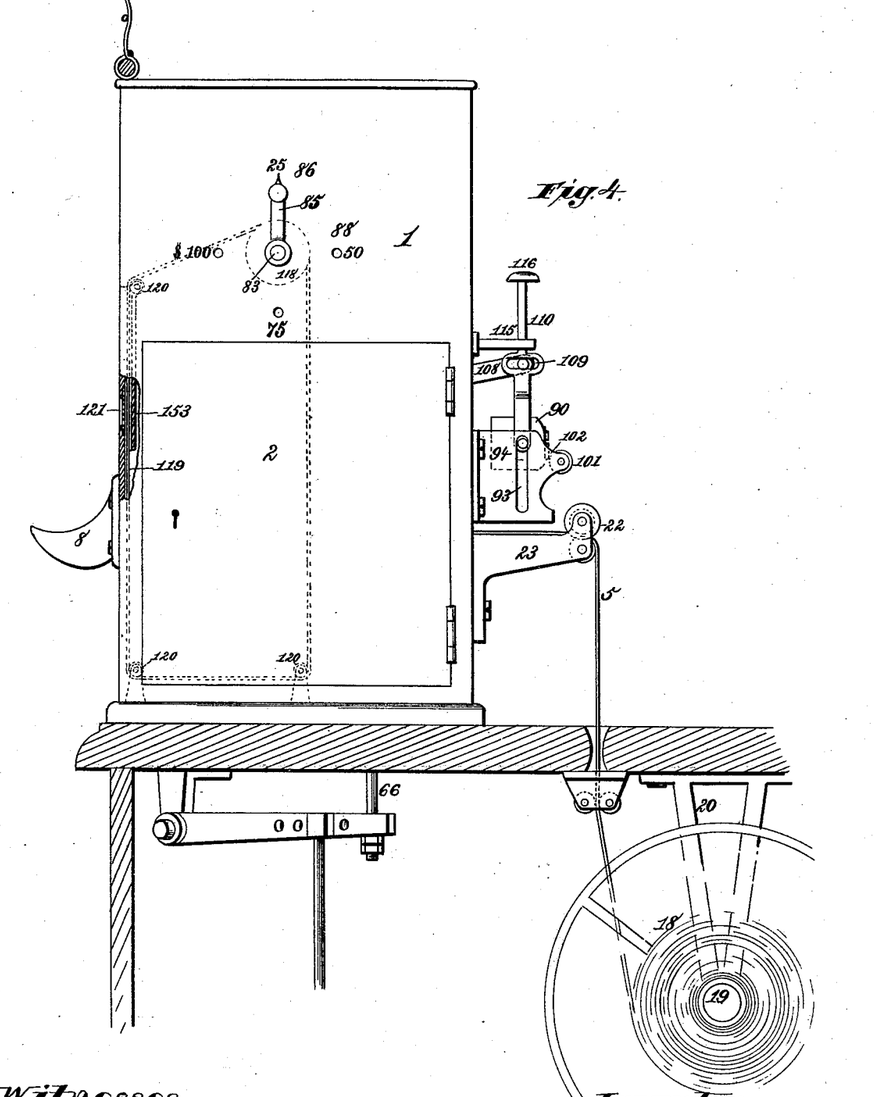
Fig. 4 is a side elevation of the machine and casing, taken from the same point of view as in Fig. 3.
Figures 5, 6:
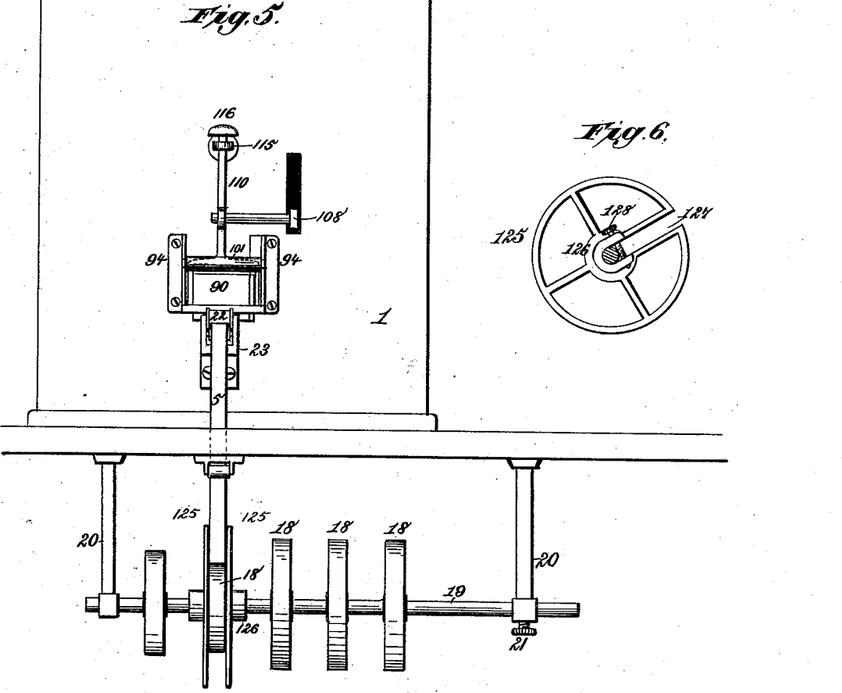
Fig. 5 is an elevation of the machine and casing opposite the delivery end.
Fig. 6 is a detail, partly in section, of the spool containing the continuous ticket-strip.
Figure 7:
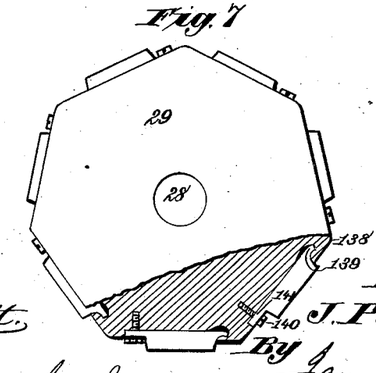
Fig. 7 is an end elevation of the multiple stamp, part of the end being broken away to fully show the stamp-plates and the manner of attaching the same.
Figure 8:
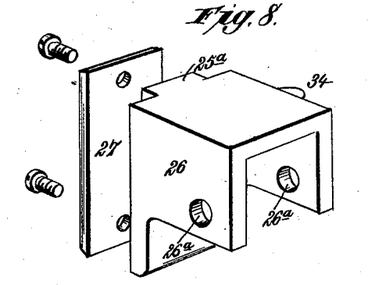
Fig. 8 is a detail perspective of the parts carrying the printing-stamp detached.
Figure 9:
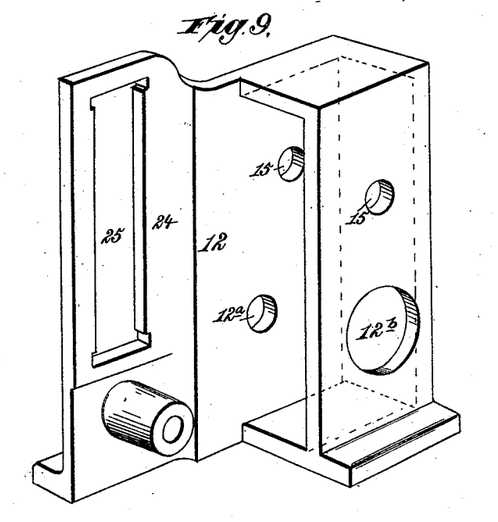
Fig. 9 is a detail perspective of the casting upon which the printing-stamp is mounted.

This roll is mounted upon an enlarged bearing, 10, provided with journals 11, which are eccentric to its axis, and which have support in the walls of a casting, 12, (shown in Fig. 9,) one of said walls having an opening, 12$^a$, which receives one of said journals, while the opposite wall is provided with an orifice, 12$^b$, which receives a disk containing a bearing for the opposite journal, the purpose of this construction being to provide for the ready union of the parts. The journals 11 are so arranged when in place that a horizontal line passing through the center of the roll will also pass through or near the center of the journal, which is upon that side of the bearing 10 contiguous to the casting 3. One of said journals is prolonged, and upon its end is rigidly mounted a lever, 13, extending upward and connected with a spring, 14, by which it is normally thrown toward the front of the casing. This movement causes the bearing 10 to turn upon its journals 11, thereby raising the feed roll 9 and causing it to approach the feed-roll 9$^a$, which lies above it and has its support in openings 15 in the casting 12. By these means automatic adjustment is given the lower feed-roll, and an elastic or yielding grip of said rolls upon the ticket-strip is secured. A rod or wire, 16, is attached to the end of the lever and carried through an opening in the wall of the casing, whereby the operator may draw the lever toward the rear, and thereby separate the rolls for the purpose of removing or for inserting the continuous ticket-strip. Upon one end of each roll is mounted a toothed annulus, 17, geared one with the other, whereby positive feed-movement is imparted to each, the actuating devices being described hereinafter. The ticket-strip 5 is taken from a roll, 18, containing a sufficient length of the ribbon for printing a large number of tickets. The variation in color and the manner of shifting these rolls to utilize such variation will be shown presently. The rolls are mounted upon a shaft, 19, supported by drop-bearings 20, beneath the casing, and secured by a set-screw, 21, which may be loosened to permit the disengagement of said shaft from its bearing at one end, whereby the spools may be slipped thereon, substantially as shown in Figs. 4 and 5. After leaving the roll or spool the ticket-strip passes between friction-rolls 22, mounted in a bracket, 23, attached to the outer side of the rear wall of the casing, and thence it passes through an opening, 23$^a$, in the wall of said casing, is led between the feed-rolls 9 and 9$^a$, and is by them fed through the ticket-trough. As it reaches the forward end of said trough, and before arriving at the point where the separate tickets are severed from the continuous strip, the printing is effected in the manner and by the means described as follows:

Cast or formed with the frame 12 is a plate, 24, lying upon one side of the ticket-trough, and having a vertical slot, 25, which receives a projection, 25$^a$, upon a rectangular frame, 26, within which the printing-stamp is journaled. Upon its outer face this projection 25ª receives a flat plate, 27, which lies against the outer face of the slotted guide-plate 24, and holds the frame 26 in position, while at the same time it permits a vertical reciprocation of the same within the limits of the slot 25. In the opposite walls of the said frame are formed openings 26ª, which receive the journals 28 of a multiple-face printing-stamp, 29. This stamp is shown in Figs. 3 and 17 as having four and seven different faces, respectively; but it is evident that by simply increasing the diameter of the block the number of such faces may be multiplied to any extent within the ordinary requirements of this class of mechanism. Upon each separate face is placed a printing-stamp, 30, as shown in dotted lines in Fig. 3, each stamp being fastened in place by means of its beveled edges, which are slid longitudinally into a dovetailed channel formed in the supporting-face of the stamp-block 29.

Formed upon or connected with the under surface of each stamp is a plate, 31, having an enlarged edge, 32, said parts engaging with a slot and communicating opening formed in the block. After the stamp is in place, a pin or screw, 33, is inserted transversely to said plate, 31, and passing through the same, whereby the stamp is held in place.

Figure 15:
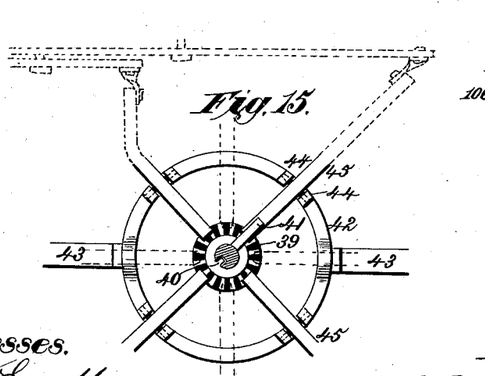
Fig. 15 is a plan view of the actuating devices whereby the several trains of registering devices are operated, said view showing the adjusting-shaft in section.

Upon one side of the frame 26 is formed a boss or projection, 34, in which is journaled a vertical shaft, 35, having upon its lower end, under said boss, a miter-gear, 36, which meshes with a similar gear, 37, upon the end of the shaft carrying the stamp-block 29. The shaft 35 passes upward through a bearing, 38, rigidly mounted upon the top of the frame 12. This bearing supports a miter-gear, 39, which is connected with the shaft 35 by a spline in such a manner that the shaft may have vertical movement with the stamp-block and carrier without in any way disturbing the position or affecting the functions of the gear 39. The construction of these parts is shown in Fig. 15, wherein the numeral 40 denotes the spline or feather upon the gear engaging with a longitudinal slot upon the shaft.

Upon the upper end of the shaft 35 is formed a striker, 41, projecting radially from and rigid upon the said shaft. Surrounding the latter, a little below the striker, is a frame, 42, which is circular, as shown, but may be of any suitable form, said frame being firmly supported by arms or plates, 43, mounted upon the register-casings. Upon the upper edge of this frame are formed two or more pairs of lugs, 44, and between each pair is pivoted a lever, 45, the inner or free end of which lies under the striker 41, or under a point to which said striker may be adjusted by the partial rotation of the shaft. The opposite end of each of these levers is connected by a link, 46, or otherwise, with the end of an actuating-lever, 47, which actuates one of the separate trains of registering mechanism contained within the closed casings, 48. These levers are fulcrumed at 49, and upon their curved ends are pivoted pawls, 50, which engage with ratchets, 51, mounted upon the shafts of the initial disks in each registering-train.

Vertical reciprocation is imparted to the stamp-block 29 by means of a pitman, 52, actuated by a disk, 53, to which it is connected by a wrist-pin, 54. This disk is rotated by a pinion, 55, rigid with it, said pinion meshing with a gear, 56, which is operated in the manner presently to be described. The pinion 55 has exactly one-fifth the number of teeth in the gear 56, so that for one complete revolution of the latter the stamp-block will make five distinct and complete reciprocations.

Upon the outer surface of the gear 56 is rigidly attached a ratchet, 57, having its periphery divided into five equidistant parts, each constituting a tooth or catch, 58, for an actuating pawl, 59. This pawl is pivotally mounted upon a pawl-carrier, 60, the axis or pivot of the pawl projecting somewhat beyond the latter and engaging with a slot, 61, in a vertically-reciprocating plate, 62. A leaf-spring, 63, is attached to the carrier 60, and bears against the back of the pawl, throwing it at all times into engagement with the ratchet 57. The plate 62 is guided in its movements by a pair of vertical standards, 64, and is thrown down by a foot-lever, to which it is connected by a link, 66, its position being restored by a spiral spring, 67.

Meshing with the gear 56 is a pinion, 68, which is journaled upon a stud, 69, projecting from the casting 12. This pinion carries a disk, 70, of larger diameter, and having at one point in its periphery a notch, 71, with a single tooth projecting from its center, thereby dividing said notch or opening into two equal parts.

Upon the shaft of the upper feed-roll, 9ª, is rigidly mounted a device, 72, commonly called a "Geneva stop," having its periphery divided into five equal parts with intervening notches 73, the portion lying between any two of said notches being concaved, to fit or lie upon the periphery of the disk 70. By rotating the pinion 68 and disk 70 the tooth standing in the notch 71, and which is long enough to project beyond the edge of the disk, will engage with one of the notches 73 in the part 72, while at the same time the projecting points upon each side of said notch will enter the openings in the disk 70 upon each side of the tooth. In this manner the part 72 will be turned through exactly one-fifth part of a revolution, after which the succeeding concavity upon the same will engage with the edge of the disk and prevent farther movement in either direction, but permitting the disk 70 to complete its rotary movement until it again reaches the position shown in Fig. 1. As the pinion 68 contains exactly one-fifth the number of teeth in the gear 56, it will be seen that said pinion will make five complete revolutions to each complete rotation of said gear, thus giving five distinct feed-movements to the feed-rolls 9 and 9ª. Moreover, by the peculiar construction and combination of the parts shown, the ticket-strip will be fed forward an exactly equal distance at each movement, and its movement will always be arrested at precisely the same point without regard to the further action of the gear 56 or the pinion 68.

Figure 1:
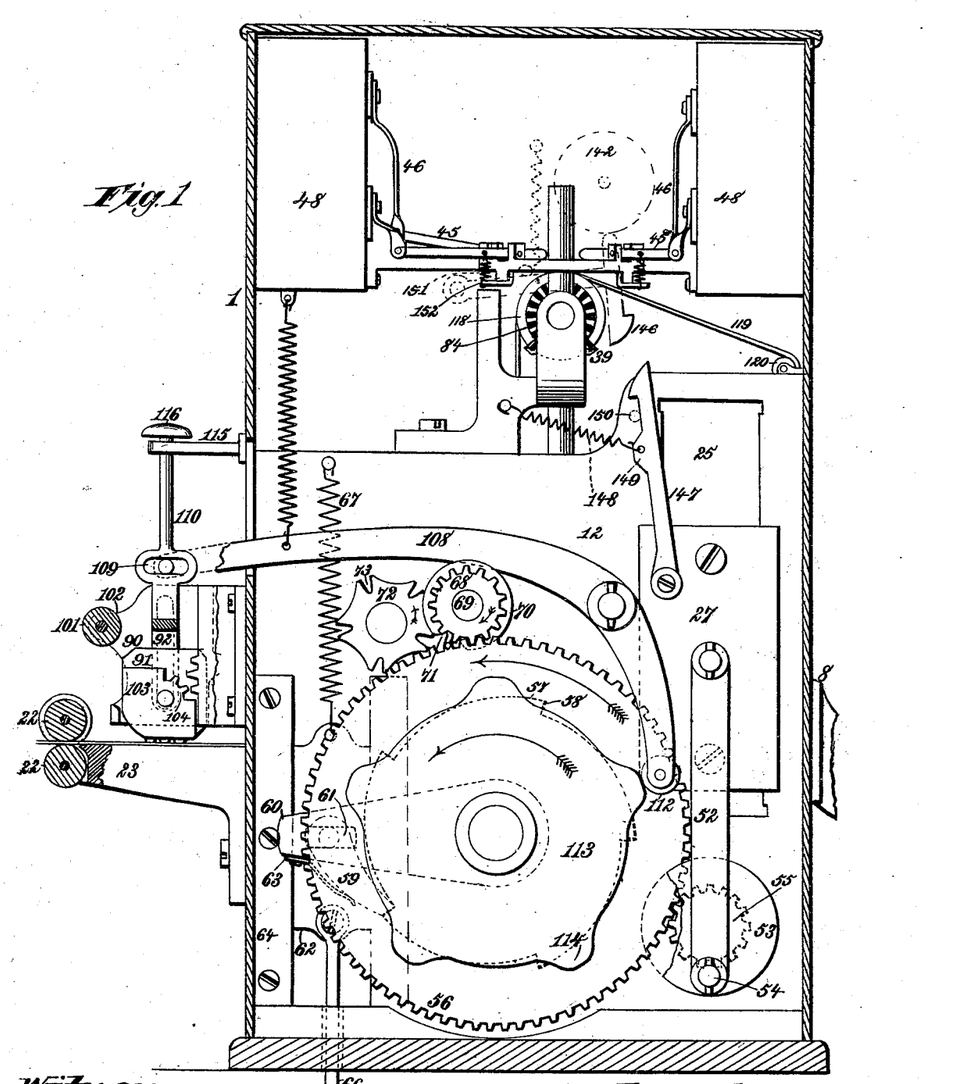
Figure 1 is a vertical section taken from end to end of the apparatus a little to one side of the line traversed by the continuous ticket-strip.
Figure 2:
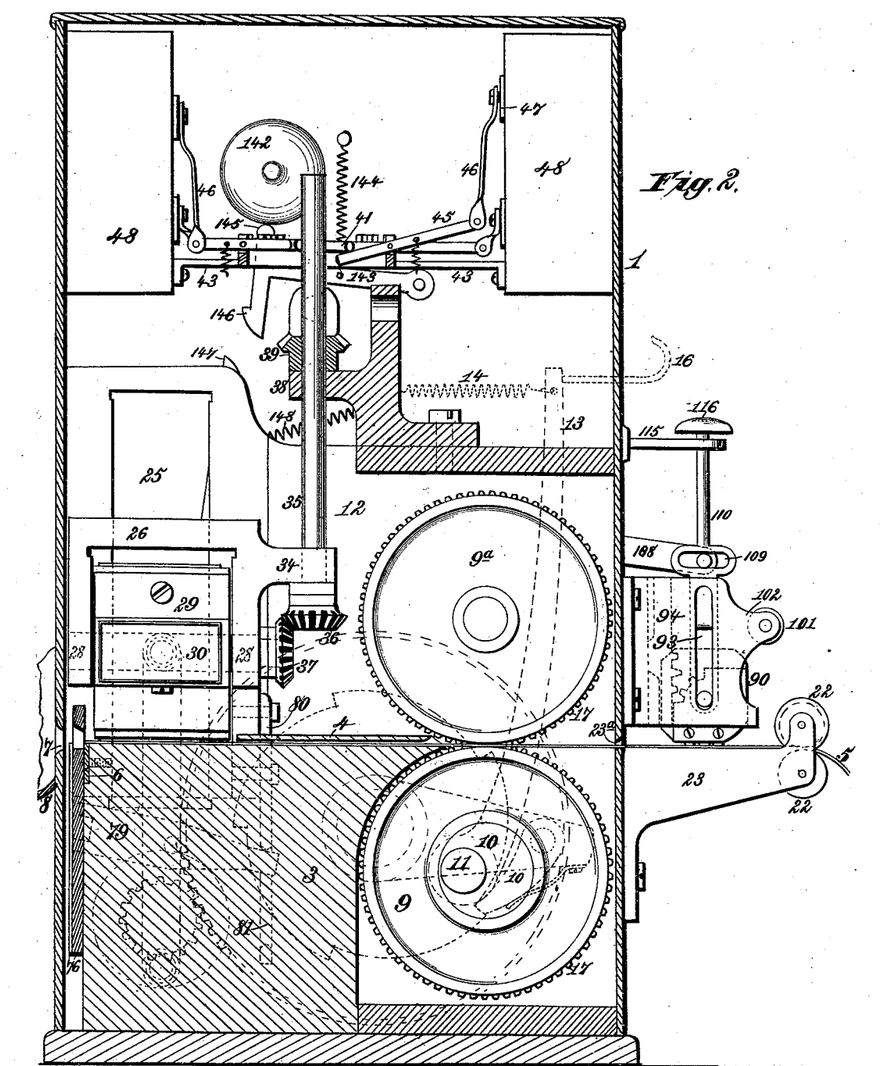
Fig. 2 is a vertical section taken in a plane passing through the ticket-strip, the point of view being opposite to that of Fig. 1.

The pawl-carrier 60 is shown in Figs. 1 and 2 as being exactly in the central point of its downward stroke. Attention is directed to the fact that when it is at this point the stamp-block 29 is brought down to its lowest point, or, in other words, into printing contact. As the pawl-carrier 60 continues its movement, the Geneva stop 72 is rotated, thereby advancing the ticket-strip one-fifth of the distance measured by a complete revolution of the feed-rolls, or the length of a single ticket. This feed takes place after the print by the stamp, and it will be readily understood therefore from Fig. 2 that the ticket printed by the descent of the stamp is by the action of the feed-rolls carried forward during the time the stamp is rising, projected from the case, and finally detached from the strip in the manner now to be described.

Upon the forward end of the casting 3 is mounted a blade, 6, over which the strip 5 passes as it emerges from the opening 7 in the wall of the casing. Upon the end of said casting are attached guide-pieces 75, within which runs a plate, 76, having an opening, 77, the upper edge of which forms a shearing angle with the cutter 6. Upon one edge of the plate is formed a stud, 78, which is engaged with a slot in the end of a lever, 79, fulcrumed between its ends upon the casting in which the ticket-trough is formed. Upon the reciprocating stamp-carrier 26 is attached a plate, 80, having in its lower end a slot, 81, within which the free end of the lever 79 is arranged, the length of the slot being such that as the stamp-carrier rises the plate 80 will actuate the lever and throw the knife-plate downward to sever the ticket just before the stamp reaches its upward limit of movement. When placed in this position, the knife, having severed the ticket, remains down, closing the entrance to the ticket-trough and preventing the fraudulent insertion of a strip from the outside or through the opening 7 in the wall of the casing.

The construction and relative arrangement of the several parts are such that the ticket-strip 5 is fed forward to bring it beneath the stamp 29 during the time said stamp is rising. It will be seen by reference to Figs. 1 and 2 that the stamp prints at the moment when the pawl-carrier to which the foot-lever is linked is at the middle point of its stroke. At this moment the Geneva stop (shown in Fig. 2) is in position to engage with and operate the upper roll, 9ª. As the stamp begins to rise, this engagement takes place. The knife-plate 76, which was raised at the moment the stamp made its impression, brings its opening 77 in line with the ticket-trough. The ticket which was printed by the stamp is projected through said opening and over the hopper 8, and as the stamp-carrier 26 approaches its upward limit of movement the slotted plate 80 engages with the end of the knife-lever 79, throws the knife-plate 76 downward, severs the ticket, and at the same time closes the outer end of the ticket-trough in the manner already described. As each ticket is printed, projected from the casing, severed from the strip, and delivered by a single operation of the foot-lever, it is desirable that each sale shall be registered by the same movement, and that tickets of different values or classes shall be registered by separate and independent registering mechanism. It is also necessary that each time the stamp is shifted to print a different ticket the actuating device shall also be changed or shifted to act upon that particular registering-train, whereby the ticket about to be printed shall be counted, in order that at the end of a day's work, or at any time, the apparatus may show not only the gross number of tickets printed and sold, but the number of tickets of each class or value. It is also necessary to so construct and combine the parts that the stamp cannot be shifted to give any legible impression without at the same time shifting the device by which the corresponding register is operated. These several results I accomplish in the manner following: The rotary stamp 29 being turned by the miter-gear 36 upon the shaft 35, the adjustment of the stamp is effected by a horizontal shaft, 83, having a gear, 84, which meshes with the gear 39, splined upon the shaft 35, in the manner already described. The end of the shaft 83 projects from the casing and receives a crank-arm, 85, having a button, 86, and provided with a detent, 87, which engages with apertures in the casing, said apertures being shown at 88 in Fig. 4 lying in the circumferential line of sweep of the crank-arm, and arranged at such distance from each other that as the arm is moved to carry the detent 87 from one aperture to the next or adjacent one the shaft 35 will receive sufficient movement to turn the stamp 29 into such position that its succeeding face may be brought into printing contact with the ticket-strip. It will readily be seen that in order to effect a printing contact the face of the stamp must be brought into substantial parallelism with the ticket-strip; but this adjustment cannot be effected without at the same time bringing the striker 41 upon the shaft 35 over the power end of one of the levers 45, by which one or other of the registering-trains is actuated. The arrangement of parts is such that the vertical shaft 35 cannot be rotated in such a manner as to bring the printing-stamp into position to print without at the same time and by the same movement bringing the striker 41 upon the shifting-shaft 35 over one of the registering-levers 45. Should the rotary adjustment fall short of or pass beyond any one of the said points, the striker 41 will not only pass upon one side or the other of said lever, but the printing-stamp also will be so inclined relatively to the surface of the ticket-strip 5 that until the striker 41 is brought squarely over the end of one of the register-levers the stamp cannot by any possibility make a printing contact with the ticket-strip, but will be so inclined as to its printing-face that one of its angular edges only will come into contact.

Figure 12:
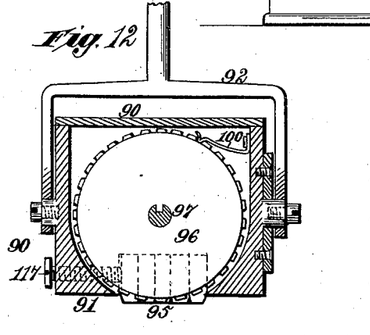
Fig. 12 is a vertical longitudinal section of the dating-stamp.
Figure 13:
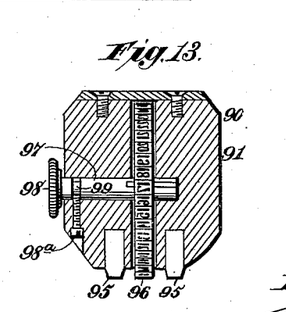
Fig. 13 is a section of the dating-stamp, taken transversely to the sectional plane of Fig. 12.
Figure 14:
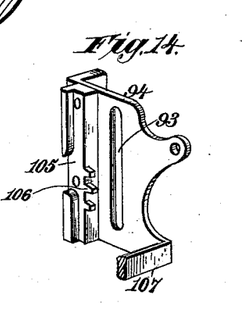
Fig. 14 is a detail perspective of the mounting-plate in which the dating-stamp has support.

The tickets are dated by a stamp, 90, which is the only part of the mechanism outside the casing. The stamp is shown in Figs. 12 and 13, consisting of a block, 91, journaled in a yoke-frame, 92, the ends of the journals being elongated and received by slots 93, formed in guide-plates 94, rigidly secured to the casing. The month and year are printed by type 95, set in the block, and the day or the number denoting it is printed by a type-wheel, 96, which is splined upon a shaft, 97, adjustable by means of a button-head, 98. The shaft is held in place by a screw, 98ᵃ, entering a groove, 99, in the periphery of the shaft, and by this construction the type-wheel may be removed, if desired. It is held in any position to which it may be adjusted by means of a spring-catch, 100, which snaps into the spaces between the type formed on the periphery of said wheel.

The dating-stamp is inked by a roll, 101, journaled in lugs 102, formed on the guide-plates 94. As the stamp rises and falls, it is swept over this roll, being rotated one-quarter of a revolution by the following means: Upon one end of the stamp-block 91 is mounted a plate, 103, having near one corner a segment of a gear, 104. Upon the adjacent vertical support 105 is formed a short rack, 106, which is placed at such a point that the stamp rises a little distance before the toothed plate 103 engages with it. When these parts mesh, the stamp is turned, bringing its face outward and drawing it as it rises over the inking-roll 101. The operation is reversed as the stamp descends, and it is inked at both movements. A clearing-bar, 107, is formed upon the guide-plate 94, to detach the ticket-strip from the stamp should it adhere thereto.

The dating-stamp is reciprocated by a lever, 108, which is pivoted upon the casting 12 and connected with a slot, 109, formed in a standard, 110, which rises from the yoke 92. The lever 108 is curved to bring its power end toward the axis of the gear 56, (see Fig. 1,) and in said end is journaled a friction-roll, 112, which has bearing upon the periphery of a multiple cam, 113, carried by the shaft of the gear 56. The multiple cam consists of a disk having on its periphery five shoulders or cam projections, 114, arranged at such equidistant points relatively to the ratchet-teeth 58 that the stamp will be actuated just an instant before the ticket-strip begins to feed forward, and when the pawl-carrier 60 is at or nearly at the middle of its stroke. The dater prints across the face of the ticket, and is provided with the standard 110, which moves in a bracket, 115, and has a head, 116, to enable the operator to actuate the stamp by hand when the end of the ticket-strip is introduced. This is readily done by entering the strip between the friction-rolls 22, stamping upon each portion forming the five tickets near or next to the end of the strip, and pushing it into the ticket-trough till the end strikes against the knife-plate 76. To permit this, the lower is thrown away from the upper feed-roll by drawing the hook 16 outward, in the manner already described.

The type 95 are inserted in the block 91 and held in place by a screw, 117.

Running over a spool, 118, upon the shaft 83, is a continuous tape, 119, which is brought, by means of supporting-rolls 120, adjacent to the wall of the casing, and made visible through an opening, 121. Upon the spool is formed a series of points or teeth, 122, which engage with openings 123 in the belt or tape, thereby giving a positive movement to the latter. The several prices or classes of tickets printed are indicated on the tape in any suitable manner, and at such points that as the adjusting-arm 85 is moved to any one of the points where the detent 87 engages, the tape will show the value of the ticket which will issue from the casing following such adjustment. The opening 121, through which the tape is seen, is arranged beside the hopper 8, to which the ticket is dropped as it is severed from the strip.

As already stated, the ticket-strip is taken from a spool or roll, 18, arranged for convenience below the stand supporting the apparatus. The roll is composed of a narrow continuous paper ribbon wound upon a thin central shell. A number of these rolls may, if desired, be furnished at the same time, and in different colors, for a purpose presently to be described. They are slipped successively upon a shaft, 19, supported in drop-bearings 20, beneath the casing of the instrument, said shaft being adjustable longitudinally to release one of its ends and permit the rolls to be mounted. When any one of said rolls is to be used, it is placed between two wheels, 125, (see Figs. 5 and 6,) the said wheels having each a hub, 126, which is open upon the side adjacent to a radial opening or passage, 127, in the wheel. The purpose of this construction is to enable the operator to detach and attach said wheels quickly and without disturbing the shaft 19. To secure them upon this shaft a small screw, 128, crosses the radial opening, as seen in Fig. 6. By removing this screw, either wheel may be easily detached from one roll and applied to another, the former being simply pushed along upon the shaft, as seen in Fig. 5.

In order to prevent the use of a forged or fraudulent ticket by enabling the proper officials to instantly detect the same, it has heretofore been customary to change color of the tickets sold at frequent intervals, the conductors being notified previously of the time or times at which a given color should be used. This system can of course only be used upon lines where tickets are sold singly and used at the time of sale—such for example, as the elevated roads of New York.

The printing-stamps 30 are inked by a roll, 130, which is journaled in the ends of arms 131, pivoted upon pivotally-mounted arms or strips 132. The latter arms are rocked upon their pivotal supports by a rigid bar, 133, carried by the reciprocating stamp-carrier, and having a pin, 134, which engages with a slot, 135, in the lower end of one of the bars 132. By the rise and fall of the bar 133 the roll-carrying arms 132 are oscillated, and the roll thrown in and out under the stamp, its supporting-arms 131 being oscillated to throw the roll upward by means of a spiral spring, 136. The upward movement is limited by a hook, 137, carried by the bar 133.

The entire construction and operation of these parts are similar to that shown and described in an application for Letters Patent filed by me upon the 15th day of January, 1885, numbered in serial 153,000.

In Fig. 2 of the drawings I have indicated four sets or independent trains of registering devices. These may be of any known construction. I have indicated the presence of four separate trains, because I have shown in the drawings a stamp having four faces, and therefore requiring only four registers. It is evident, however, that the number may be increased, and I have indicated by dotted lines in Fig. 15 how four additional register-levers may be added.

As a modification of the stamp shown in Figs. 2 and 3, I may employ the construction shown in Fig. 17. In this form the stamp-block consists simply of a body of wood or metal of polygonal form, and having any required number of faces. Each face is cut down upon its surface in such manner as to leave the projecting portion 138. In the angle formed by said projection is cut or otherwise formed a cavity, which receives the flanged edge 139 of the stamp. This flange is slightly curved upward, so that when inserted the stamp is raised off its bed or support. When lowered, a screw, 140, passes through a flange, 141, upon the other edge of the stamp, and fastens it securely in place.

A gong, 142, may be placed within the casing and sounded at each stroke of the stamp in the manner following: Pivoted upon the wall of the casing, inside, is a lever, 143, normally thrown upward by a spring, 144, to strike the gong by a projection, 145. Formed upon the lever is a hook, 146. Pivotally mounted on the stamp-carrier, or on the plate 27, is a hook, 147, drawn over toward the hook 146 by a spring, 148, and having a boss or projection, 149. The hook 147 rests normally against a pin, 150, by which it is supported in line beneath the hook 146. The pin 150 is upon the casting, whereas the hook 147 is pivoted upon the stamp-carrier, and as the latter rises and falls the boss 149 strikes the pin and throws the hook 147 backward, allowing it to pass the end of the hook 146. As the boss passes by the pin, the tension of the spring 148 draws the hook forward and engages it with the hook on the lever 143. As the stamp descends, the lever is drawn down with the pivoted hook 147 until the boss or projection 149 strikes the pin 150. This throws the hook 147 off the hook upon the lever 143, and the latter is instantly thrown upward by a spring, 144, whereby the gong is rung.

The register-levers 45, as shown in Fig. 3, are restored to place after each operation by means of springs 151, connected to angle-plates 152, which may conveniently be mounted upon the frame 42.

Just in rear of the opening 121, through which the tape 119 is seen, I may mount a plate, 153, for the purpose of holding the tape closely up to the aperture, and to prevent it from creasing or wrinkling at that point.

I do not claim, broadly, the combination, with an adjustable stamp having two or more faces, each carrying a form of different character, and two or more separate series of registering devices, of an actuating device carried by the stamping mechanism and means for shifting the position of the same to act upon any one of said registers.

The subject-matter mentioned is shown and described and claimed in an application for Letters Patent filed by me upon the 15th day of January, 1885, Serial No. 153,000, and renewed upon the 16th day of September, 1885, Serial No. 177,299.

Having thus described my invention, what I claim, and desire to secure by Letters Patent of the United States, is—

1. The combination, in a single apparatus, of a multiple face-stamp for printing tickets of different values, two or more independent levers adapted to actuate trains of registering devices, said levers having substantially a radial arrangement, and means, substantially as described, for actuating said levers, the actuating device being shifted by the change of the stamp, so that each ticket is registered under its own class or value, substantially as specified.

2. The combination, in a single mechanism, of means, substantially as described, for printing tickets of different values, two or more independent levers adapted to actuate trains of registering mechanism, and means, substantially as described, for shifting the device operating the said levers by the adjustment of the stamp, substantially as specified.

3. The combination, with a reciprocating printing-stamp for printing tickets, of feed-rolls for advancing the ticket-strip, a multiplying gear from which motion is derived, a pinion meshing therewith and carrying a notched disk, and a Geneva stop mounted upon the shaft of one of the feed-rolls and engaging with said disk, substantially as described.

4. The combination, with a reciprocating stamp for printing tickets of different values, of rolls which feed a continuous ticket-strip beneath said stamp upon the upward motion of the latter, a knife-plate having a shearing opening, through which the printed end of the strip passes at each feed movement, said knife-plate being arranged across the end of the ticket-trough, and an actuating-lever connected with said plate and moved by a slotted bar mounted upon the reciprocating stamp-carrier, whereby the knife-plate is raised to open a passage for the printed end of the strip at the last moment of the downward movement of the stamp, and thrown down to sever the expelled ticket as the stamp completes its upward movement, thus closing access to the ticket-trough between the successive imprints, substantially as specified.

5. The combination, with a changeable stamp for printing tickets of different values, of a pair of feed-rolls advancing a continuous ticket-strip, and a dating-stamp receiving movement from the same prime motor, all the mechanism, with the exception of the dating-stamp, being contained within a closed casing, substantially as specified, whereby the dater may have daily adjustment without access to the case.

6. The combination, with a changeable stamp for printing tickets of different values, of feed-rolls for advancing a ticket-strip, two or more independent levers actuating separate trains of registering devices, said levers being moved by a device reciprocating with the stamp, and means, substantially as described, for shifting the stamp, and the device operating the registers, a dating-stamp, a lever actuating the same, and a cam carried by one of the gears driving the feed-rolls, whereby said lever is reciprocated, substantially as specified.

7. The combination, with a multiple-face stamp for printing tickets of different values, of a shaft having bearing in the stamp-carrier, a gear mounted upon said shaft and meshing with a gear upon the stamp-shaft, a gear splined upon the actuating-shaft and meshing with a gear upon a setting-shaft which projects outside a casing inclosing the parts, an arm upon the end of said shaft by which the stamp may be shifted, and a striker mounted upon the intermediate or actuating shaft and rotating with said shaft at each adjustment of the stamp to bring it in position to operate one of a series of register-levers, whereby each ticket printed is registered upon its appropriate register, substantially as specified.

8. The combination, with a multiple-face stamp having vertical reciprocation, of a ticket-trough containing a continuous ticket-strip, feed-rolls for advancing said strip at intervals, a plate having a shearing opening and arranged to reciprocate on the end of and across the ticket-trough, a slotted bar mounted on the stamp-carrier, a knife-actuating lever engaging with the slot in said bar, and a casing inclosing the parts, but having an opening registering with the ticket-trough, whereby the knife is thrown up to permit the passage of the printed ticket as the stamp descends to make an impression, and is thrown down to sever a ticket and close the ticket-trough as the stamp rises, substantially as specified.

9. The combination, with a printing-stamp having a plurality of faces, of a ticket-trough against which said stamp is reciprocated, feed-rolls for advancing a ticket-strip, two or more independent register-levers actuated by a striker upon the shaft adjusting the stamp, a closed casing containing said parts, and a dating-stamp actuated by a lever connected with the prime motor, said dater being arranged outside the casing, substantially as specified.

10. The combination, with a reciprocating stamp for dating the continuous ticket-strip, of guides in which the stamp-carrier reciprocates, a rack upon one of said guides, and a gear or segment of a gear upon the stamp-carrier meshing with said rack as the stamp rises, and an ink-roll journaled in bearings in front of said stamp, substantially as specified.

11. The combination, with two or more separate trains of registering-disks, of actuating-levers connected with the initial disks therein, and having their free ends arranged radially around a shaft moving with and geared to the axis of the stamp, whereby any one of the faces of said stamp may be adjusted in printing position, and a striker upon said shaft which is brought at each stamp-adjustment into position to operate one of the register-levers, substantially as specified.

12. The combination, with a reciprocating stamp having a plurality of faces, of a reciprocating stamp-carrier, a pitman connected thereto and to a wrist-pin on a disk rotated by a pinion, a multiplying gear meshing with the pinion, a pawl carrier on the axis of said gear, a ratchet rigid with said axis, with which the pawl engages, and a foot-lever linked to the pawl-carrier, the parts, with the exception of the foot-lever, being in a closed casing, substantially as specified.

13. The combination, with a printing-stamp having a plurality of faces, of a shaft moving with the stamp-carrier and geared with the axis of the stamp, an adjusting-shaft geared to the movable shaft, and having one end projecting outside a closed casing containing said mechanism, an arm mounted upon the end of said shaft, and a pin or detent carried by said arm and engaging with openings or depressions in the wall of the casing, whereby the proper adjustment of the stamp is indicated, substantially as specified.

14. The combination, in a machine for printing tickets, of a reciprocating stamp, feed-rolls for advancing a continuous ticket-strip, a Geneva stop mounted upon the shaft of one of said rolls, a notched and toothed disk engaging with said stop, a pinion carrying said disk, a multiplying gear meshing with the pinion, a ratchet concentric with and rigidly mounted on the shaft of the multiplying gear, a pawl engaging with said ratchet and mounted on a pawl-carrier pivotally supported on said shaft, and means for vibrating the pawl-carrier, substantially as described.

15. The combination, with a multiple-face stamp, of a ticket-trough against which said stamp is thrown at each reciprocation, a stamp-carrier, a shaft geared with the axis of the rotating stamp and moving with the carrier, and an adjusting-shaft geared with the movable shaft and having an arm attached to one end which projects outside of a casing containing said parts, a detent carried by said arm and engaging with depressions in the wall of the casing, a spool carried by the adjusting-shaft, and a ribbon or tape moved by said spool behind an opening in the wall of the casing, whereby the value, class, or kind of tickets printed by the stamp under a given adjustment is indicated, substantially as specified.

16. The combination, with a reciprocating stamp-carrier, a multiple-face stamp carried thereby, and two or more independent series of registering trains, of a striker by which the register-levers are operated, and means, substantially as described, whereby the said striker receives an adjustment simultaneously with the change of the stamp, whereby the shifting of said stamp shall be accompanied by a corresponding change in the position of said striker, substantially as herein specified.

17. The combination, with a reciprocating stamp, of feed-rolls for advancing a continuous ticket-strip beneath said stamp, gearing for driving said rolls, a multiple cam concentric with and carried by one of said gears, a lever actuated by said cam, and a reciprocating dating-stamp operated by said lever, the mechanism, with the exception of the dating-stamp, being placed in a closed casing, substantially as described.

18. The combination, with a ticket-printing apparatus, of a detachable shaft and a series of spools or rolls of paper ribbon of different colors mounted on said shaft and longitudinally adjustable thereon, substantially as described.

In testimony whereof I affix my signature in presence of two witnesses.

J. PARIS DUNN.

Witnesses:
J. A. RUTHERFORD,
GEORGE W. REA.